United States Patent [19]

Matsuda et al.

[11] Patent Number: 5,995,037
[45] Date of Patent: Nov. 30, 1999

[54] OBSTACLE DETECTION SYSTEM FOR A VEHICLE

[75] Inventors: Shohei Matsuda; Yoichi Sugimoto; Satoshi Hada; Shoji Ichikawa; Yoshihiro Urai, all of Wako, Japan

[73] Assignee: Honda Giken Kogyo Kabushiki Kaisha, Tokyo, Japan

[21] Appl. No.: 09/105,997

[22] Filed: Jun. 29, 1998

[30] Foreign Application Priority Data

Jun. 30, 1997 [JP] Japan ..................................... 9-174492

[51] Int. Cl.⁶ ...................................................... G01S 13/93
[52] U.S. Cl. ............................................... 342/71; 342/70
[58] Field of Search .............................. 342/70, 71, 109, 342/72; 340/435, 436, 903

[56] References Cited

U.S. PATENT DOCUMENTS

| | | | |
|---|---|---|---|
| 5,343,206 | 8/1994 | Ansaldi et al. | 342/72 |
| 5,598,164 | 1/1997 | Reppas et al. | 342/70 |
| 5,699,040 | 12/1997 | Matsuda | 340/435 |
| 5,798,727 | 8/1998 | Shirai et al. | 342/70 |

FOREIGN PATENT DOCUMENTS

| | | |
|---|---|---|
| 6-160510 | 6/1994 | Japan . |
| 8-240660 | 9/1996 | Japan . |

*Primary Examiner*—Ian J. Lobo
*Attorney, Agent, or Firm*—Nikaido, Marmelstein, Murray & Oram LLP

[57] ABSTRACT

In an obstacle detection system for a vehicle which has a radar having an electromagnetic wave transmission device and a reflected wave reception device, the electromagnetic transmission device transmits electromagnetic waves in a direction in which the vehicle is traveling, and the reflected wave reception device receives reflected waves produced when the electromagnetic waves transmitted from the electromagnetic wave transmission device are reflected by an object present in the traveling direction of the vehicle. The system detects obstacles present in the traveling direction of the vehicle based on the result of a radar search operation, and it is possible to identify only those objects detrimental to the traveling of the vehicle as obstacles. An obstacle decision device decides whether or not the object detected by the radar is an obstacle, by using the detected value determined by a vehicle speed detection device which detects the speed of the vehicle, the calculated value determined by a relative distance calculation device that calculates a relative distance to the object present in the traveling direction of the vehicle based on the result of search operation by the radar, and the calculated value determined by an overlap calculation device that calculates an overlap in the width direction of the vehicle between the vehicle and the object according to the result of the search operation by the radar.

7 Claims, 6 Drawing Sheets

OBSTACLE DETECTION SYSTEM FOR A VEHICLE

BACKGROUND OF THE INVENTION

1. Field of the Invention

The present invention relates to an obstacle detection system for a vehicle, having a radar which includes an electromagnetic wave transmission means for transmitting an electromagnetic wave in a direction in which the vehicle is traveling and a reflected wave reception means for receiving a reflected wave produced when the electromagnetic wave transmitted from the electromagnetic wave transmission means is reflected by objects present in the traveling direction of the vehicle. The system detects obstacles in the traveling direction of the vehicle based on the detection result of the radar.

2. Description of the Prior Art

A system has been known, as disclosed for example in Japanese Patent Application Laid-Open Nos. 8-240660 and 6-160510, which has a radar to transmit an electromagnetic wave such as laser in the forward direction in which a vehicle is traveling and receive an electromagnetic wave reflected from an object present in front of the vehicle. The radar detects the obstacle in front of the vehicle based on the result of a search operation of the radar and, according to the result of detection, issues an alarm to urge a driver to avoid the obstacle or automatically performs an obstacle avoidance braking.

The above conventional obstacle detection system, however, does not consider an overlap of the vehicle and the object in the width direction of the vehicle. Thus, even when the object's overlapping amount is such that the object can in reality be avoided by a steering operation, the system issues an alarm or performs an automatic braking to avoid a crash. This may increase the frequency of system operation for avoiding a crash with obstacles and also raise the possibility of erroneous operation.

SUMMARY OF THE INVENTION

The present invention has as its objective to provide an obstacle detection system for a vehicle that can detect as obstacles only those objects that will hinder the traveling of the vehicle.

To achieve the above objective, a first feature of the present invention comprises a radar including an electromagnetic transmission means for transmitting an electromagnetic wave in the traveling direction of the vehicle and a reflected wave reception means for receiving a reflected wave produced when the electromagnetic wave transmitted from the electromagnetic wave transmission means is reflected by an object present in the traveling direction of the vehicle. The obstacle detection system can thus detect an obstacle present in the traveling direction of the vehicle based on the result of search operation of the radar. A vehicle speed detection means detects the speed of the vehicle and a relative distance calculation means calculates a relative distance to the object present in the traveling direction of the vehicle based on the result of a search operation of the radar. An overlap calculation means calculates an overlap in the width direction of the vehicle between the vehicle and the object according to the result of the search operation of the radar, and an obstacle decision means decides whether or not the object detected by the radar is an obstacle, based on a detected value determined by the vehicle speed detection means, a calculated value determined by the relative distance calculation means, and a calculated value determined by the overlap calculation means.

The configuration of the above system makes it possible to determine whether or not the objects found by the radar are obstacles, based on the speed of the vehicle, the overlap in the width direction of the vehicle between the vehicle and the objects and the relative distance between the vehicle and the objects. Hence, of the objects detected by the radar, those with a relatively small overlap and a relatively large relative distance can be prevented from being identified as obstacles and only those objects detrimental to the traveling of the vehicle are identified as obstacles.

In addition to the configuration of the above described system, this invention has a second feature which includes an annunciation means that makes an annunciation according to the decision made by the obstacle decision means that the object found is an obstacle. This allows the driver to be informed, in advance, of the possibility that control of the vehicle to avoid a crash with the object in the traveling direction of the vehicle which is identified as an obstacle, may be performed and thus can prevent the driver from being unprepared for a crash avoiding control operation.

In addition, this invention has a feature which further includes a brake signal output means which outputs a signal to activate an automatic braking device according to the decision made by the obstacle decision means that the object detected by the radar is an obstacle. Thus, the automatic braking to avoid a crash with the detected obstacle can be performed at an appropriate time.

In addition this invention has another feature in which the obstacle decision means has a distance calculation unit which calculates a distance to the object required for the driver to steer away from the object detected by the radar, by using a detected value determined by the vehicle speed detection means, a calculated value determined by the overlap calculation means, and a calculated value determined by the relative distance calculation means. With this feature, a reference distance used to perform control to avoid the obstacle present in the traveling direction of the vehicle, can be precisely determined based on the overlap, the speed of the vehicle and the relative distance to the front object, thereby preventing haphazard conducting maneuvering required in avoiding a crash with the object in the traveling direction of the vehicle.

The distance calculation unit according to this feature preferably calculates the distance according to the relative speed with respect to the object, which is determined from the detected value determined by the vehicle speed detection means and the calculated value determined by the relative distance calculation means, and according to the time during which the vehicle is steered to laterally move the distance equal to the calculated value of the overlap calculation means.

The mode for carrying out the invention will be explained by referring to one embodiment of the invention shown in the accompanying drawings.

DETAILED DESCRIPTION OF THE PREFERRED EMBODIMENT

Figure 1:
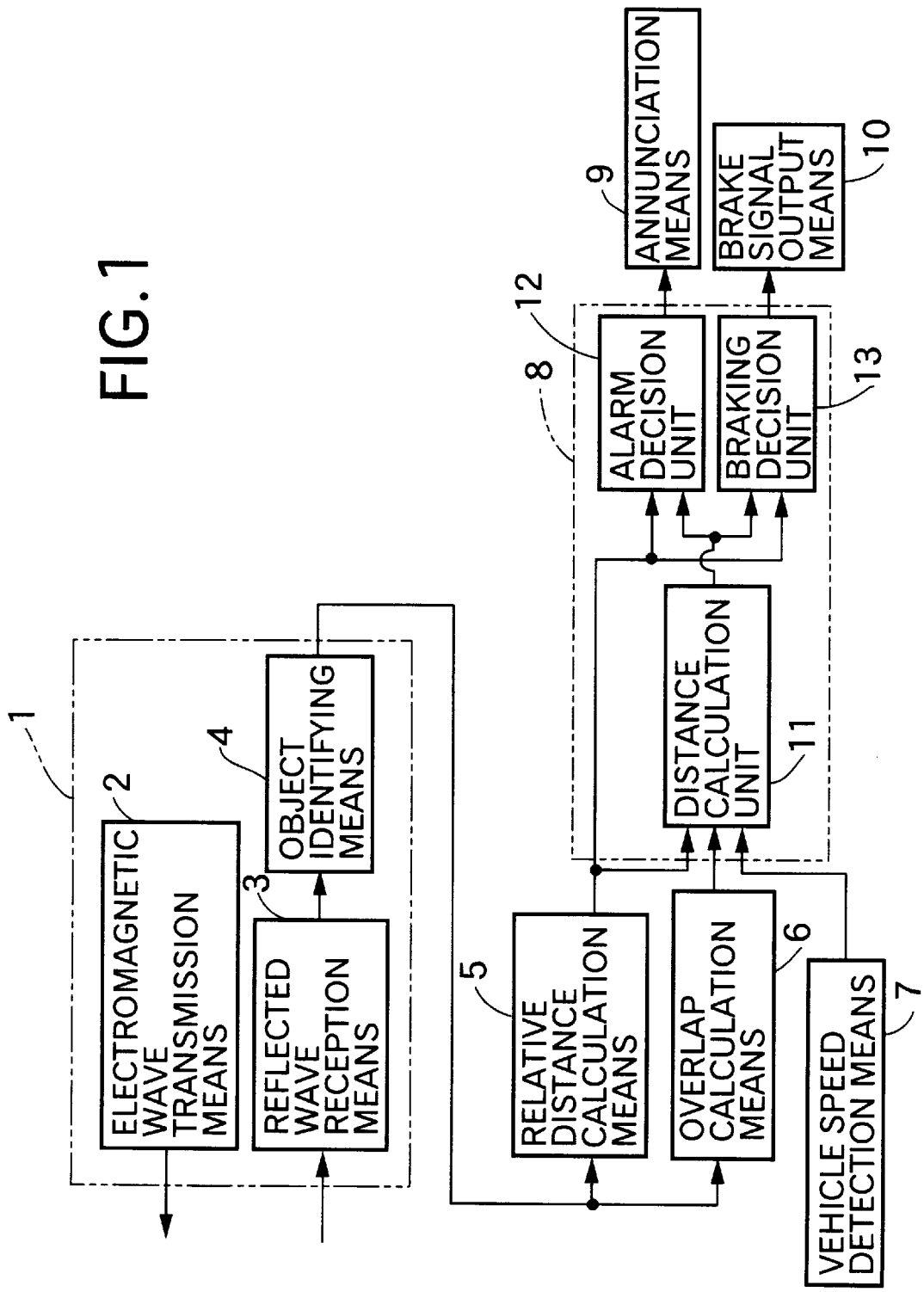
FIG. 1 is a block diagram showing the configuration of the obstacle detection system for a vehicle according to an embodiment of the present invention.

Referring to FIG. 1, a radar is installed, for example, in the front part of a vehicle (not shown). The radar 1 can detect objects in a traveling direction of the vehicle. The radar 1 includes an electromagnetic wave transmission means 2 that transmits electromagnetic waves, such as laser or millimeter waves, in a direction in which the vehicle is traveling; a reflected wave reception means 3 that receives a reflected wave produced when the laser transmitted from the electromagnetic wave transmission means 2 is reflected by an object in the traveling direction of the vehicle; and an object identifying means 4 that identifies an object present in the traveling direction of the vehicle according to the result of reception by the reflected wave reception means 3.

The result of search operation performed by the radar 1 is entered into a relative distance calculation means 5 and an overlap calculation means 6. The relative distance calculation means 5 calculates the relative distance in the direction of vehicle movement, between the vehicle and an object in the traveling direction of the vehicle. The overlap calculation means 6 calculates the overlap in the direction of vehicle width, between the vehicle and the object.

The calculated values determined by the relative distance calculation means 5 and the overlap calculation means 6 and the detected value determined by a vehicle speed detection means 7 that detects the speed of the vehicle, are fed to a obstacle decision means 8. The obstacle decision means 8 does not identify an object as an obstacle, which has a relatively small overlap with the vehicle in the vehicle width direction and a relatively large distance to the vehicle, but does identify an object as an obstacle whose overlap is relatively large and whose distance to the vehicle is relatively small.

Figure 2:
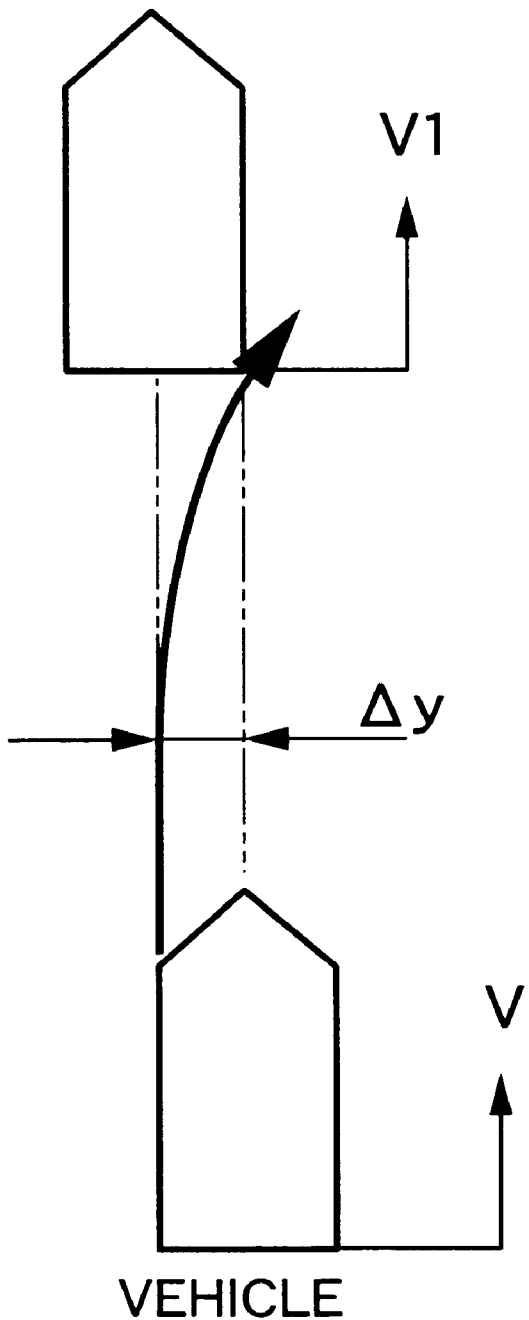
FIG. 2 is a schematic diagram showing the relative positional relation between a preceding vehicle as an obstacle and the vehicle having the obstacle detection system according to an embodiment of the present invention.
Figure 3:
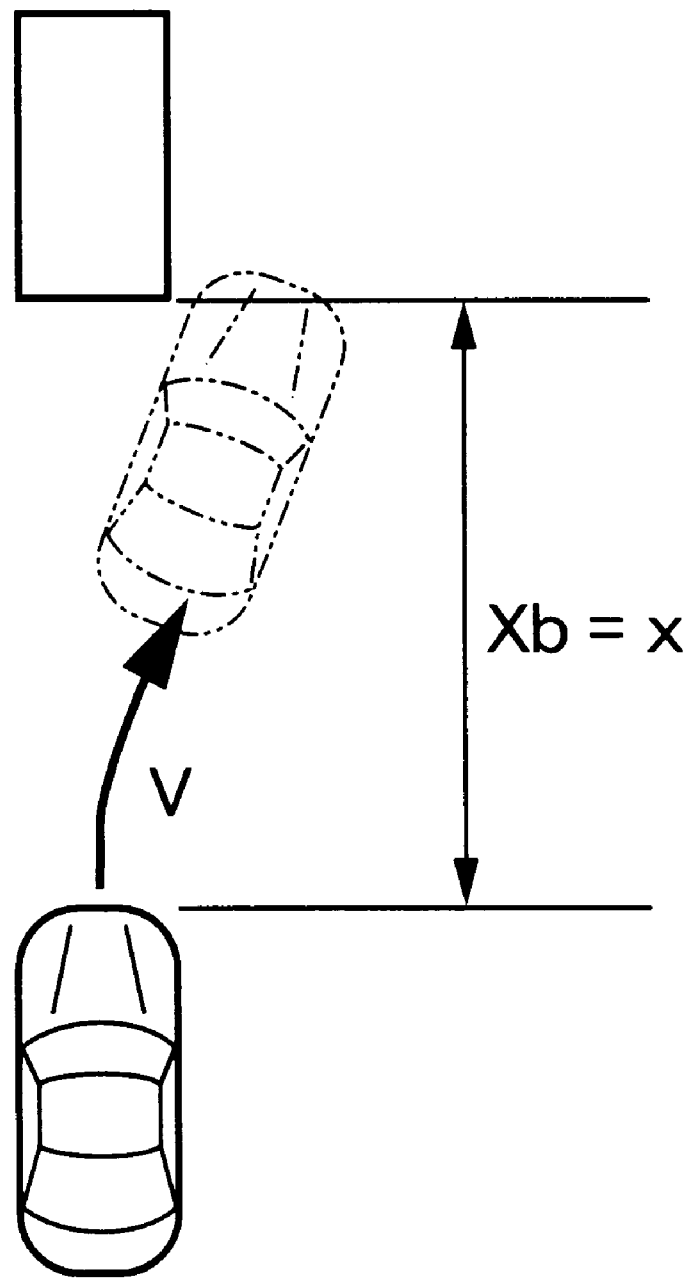
FIG. 3 is a schematic diagram for explaining a crash avoidable distance when the preceding vehicle is stopped.

Considering the situation where an object present in the traveling direction of the vehicle, such as another vehicle, is stopped. When the vehicle mounted with the system and the preceding vehicle overlap by $\Delta y$ in the vehicle width direction, if the vehicle is moved laterally a distance equal to the overlap $\Delta y$ by a steering operation as shown in FIG. 2 to avoid the preceding vehicle, the vehicle moves forward a distance x during this period. Hence, the limit distance Xb required between the vehicle and the preceding vehicle to steer away from the preceding vehicle is given by $$Xb = x \tag{1}$$

Figure 4:
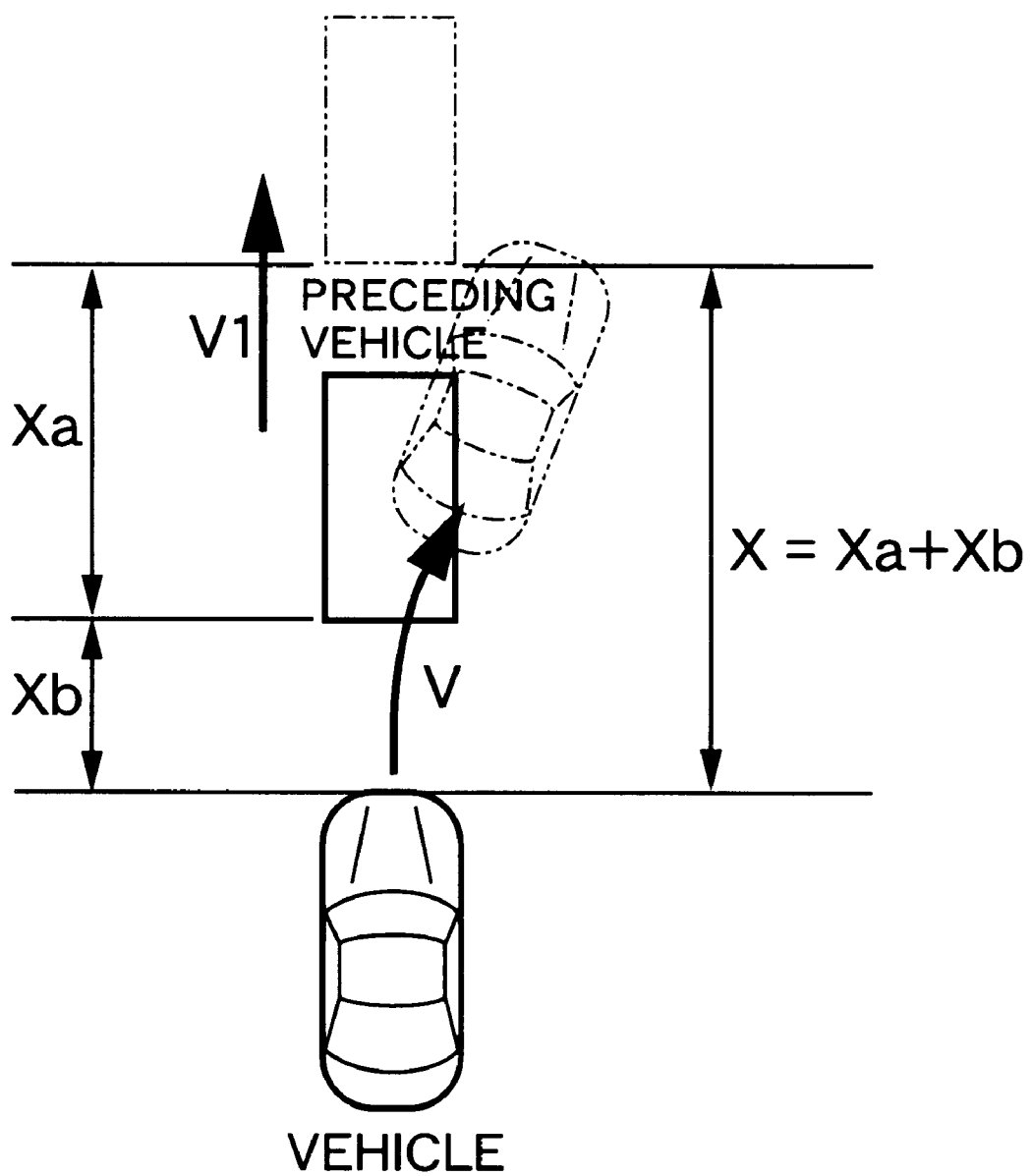
FIG. 4 is a schematic diagram for explaining a crash avoidable distance when the preceding vehicle is traveling at a constant speed.

Considering the situation in which the preceding vehicle is moving forward at a constant speed of V1, Td equals the time it takes for the vehicle to move laterally a distance equal to the overlap $\Delta y$, to avoid the preceding vehicle through steering operation. Because the preceding vehicle advances a distance $Xa=(V1\times Td)$ during the time Td as shown in FIG. 4, the limit distance Xb required between the one vehicle and the preceding vehicle for the vehicle to steer away from the preceding vehicle is given by $$Xb = x - Xa \tag{2}$$
$$= x - (V1 \times Td)$$

The distance x that the vehicle travels forward when it is steered to laterally move the overlap distance $\Delta y$ to steer clear of the preceding vehicle, is slightly different from the distance that it travels straightforwardly during the time Td. Hence the following equation can be considered to hold.

$$x = V \times Td \tag{3}$$

where V is the speed of the vehicle. Substituting the above equation (3) into the equation (2) results in $$Xb = (V \times Td) - (V1 \times Td) \tag{4}$$
$$= (V - V1) \times Td$$

Here, the time Td is a time during which the vehicle is steered to laterally move the overlap distance $\Delta y$ and this depends on the capability of the vehicle. Therefore, by calculating or measuring the time Td for the overlap distance beforehand for each vehicle, the time Td can be determined corresponding to the overlap distance $\Delta y$. The speed V1 of the preceding vehicle can be calculated from the relative speed of the preceding vehicle with respect to the vehicle based on the change in relative distance between the vehicle and the preceding vehicle, and from the speed V of the vehicle.

The obstacle decision means 8 includes a distance calculation unit 11 which calculates the limit distance Xb required between the object detected by the radar 1 and the vehicle, in order for the driver to steer away from the object by using the overlap distance determined by the overlap calculation means 6, the relative distance determined by the relative distance calculation means 5, and the speed V of the vehicle determined by the vehicle speed detection means 7. An alarm decision unit 12 decides whether or not to issue an alarm by comparing a first set distance $Xb_1$ determined by the distance Xb determined by the distance calculation unit 11 and the relative distance determined by the relative distance calculation means 5. A braking decision unit 13 decides whether or not to activate an automatic braking device by comparing a second set distance $Xb_2$ determined by the distance Xb determined by the distance calculation unit 11 and the relative distance determined by the relative distance calculation means 5. When the alarm decision unit 12 decides that an alarm must be issued, an annunciation means 9 using voice or display, is activated. When the braking decision unit 13 decides that the automatic braking operation must be activated, a brake signal output means 10 outputs a brake signal to the automatic braking device.

The distance calculation unit 11 calculates the distance Xb according to equation (4) above. That is, it calculates the distance Xb from the relative speed (V−V1) with respect to the object which is determined by the detected value determined by the vehicle speed detection means 7 and the calculated value determined by the relative distance calculation means 5, and from the time Td during which the vehicle steers sideways and moves laterally the distance calculated by the overlap calculation means 6.

Figure 5:
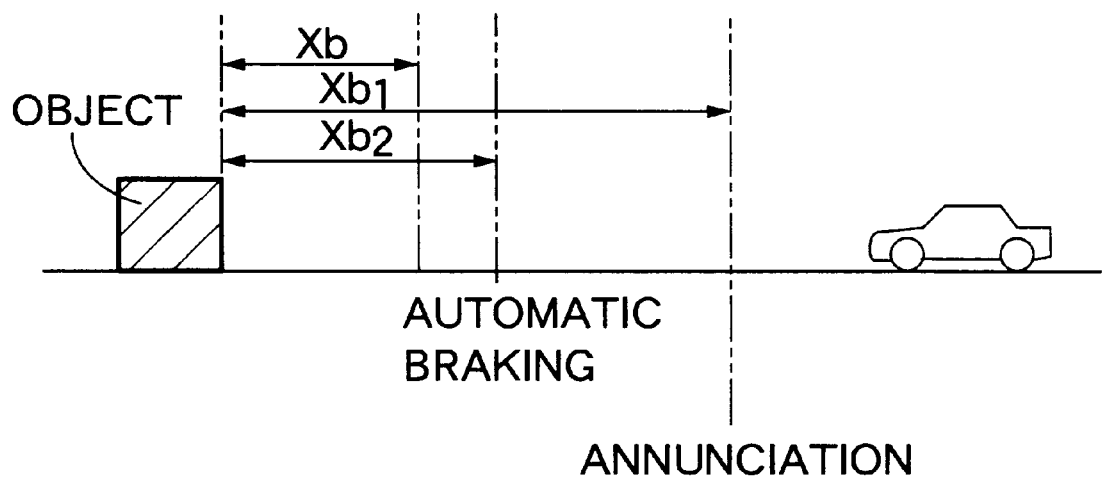
FIG. 5 is a schematic diagram showing the alarm timing and the automatic braking timing in terms of the distance between the vehicle and the object present in the traveling direction of the vehicle.

The second set distance $Xb_2$ is set larger than the limit distance Xb considering the operation delay of the automatic braking device. The first set distance $Xb_1$ is set larger than the second set distance $Xb_2$ to activate the annunciation means 9 before the automatic braking device operates. The relationship among these distances Xb, $Xb_1$ and $Xb_2$ is shown in FIG. 5.

Next, the operation of this embodiment will be explained. The determination of whether an object detected by the radar 1 is an obstacle, is decided by the obstacle decision means 8 based on the speed V of the vehicle, the overlap Δy in the width direction of the vehicle between the vehicle and the object, and the relative distance between the vehicle and the object. This decision is made in such a manner as not to identify as an obstacle, an object that has a relatively small overlap Δy and a relatively large relative distance, thereby detecting as obstacles only those objects that will hinder the traveling of the vehicle.

The obstacle decision means 8 has the distance calculation unit 11 that calculates the distance Xb to the object required for the driver to steer away from the object detected by the radar 1. Calculation unit 11 uses the detected value determined by the vehicle speed detection means 7, the calculated value determined by the overlap calculation means 6 and the calculated value determined by the relative distance calculation means 5. Thus, by precisely calculating the distance Xb, a reference that is used to perform control to avoid an obstacle present in the traveling direction of the vehicle, the obstacle decision means 8 can therefore prevent haphazard conducting of maneuvering required in avoiding a crash with an object in the traveling direction of the vehicle.

Because the annunciation means 9 makes an annunciation when the alarm decision unit 12 of the obstacle decision means 8 decides that there is an obstacle in the traveling direction of the vehicle, the driver can be informed beforehand of the possibility that the automatic braking may be activated to avoid a crash with an object in the traveling direction of the vehicle identified as the obstacle. This will prevent the driver from being unprepared for automatic braking.

Further, when the braking decision unit 13 of the obstacle decision means 8 decides that the automatic braking device must be activated, the brake signal output means 10 issues a brake signal, activating the automatic braking device. This enables the automatic braking for avoiding a crash with the detected obstacle, to be performed at an appropriate timing.

Figure 6:
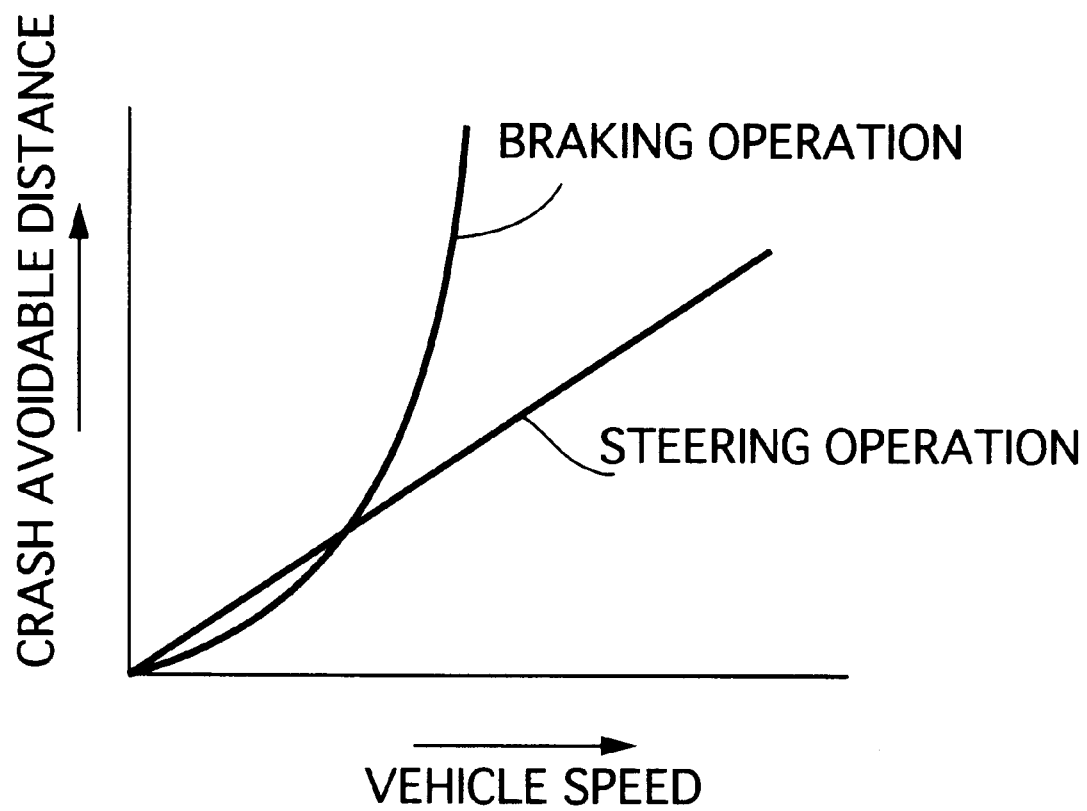
FIG. 6 is a diagram showing a crash avoidable distance based on the steering operation and the braking operation.

FIG. 6 shows that the crash avoidance limit distance when the driver steers away from the obstacle in the traveling of the vehicle differs from the crash avoidance limit distance when the vehicle is braked. As the vehicle speed V increases, the limit distance for the steering operation is shorter than that for the braking. This means that if the automatic braking device is activated based on the second set distance $Xb_2$, which is set according to the limit distance Xb, there may be a situation where it is difficult to avoid a crash with an obstacle in the traveling direction of the vehicle. As long as it is possible to steer clear of the obstacle through the steering operation, this system avoids effecting the automatic braking that is a nuisance for the driver.

While the above embodiment determines the time Td only according to the vehicle's capability, the time Td may be determined beforehand by detecting the conditions of the road surface on which the vehicle is traveling and determining the time Td in advance according to the vehicle's capability and the road surface conditions. When the distance between the vehicle and the object in the traveling direction of the vehicle reaches the distance Xb calculated by the distance calculation unit 11, the annunciation means 9 may be activated to use voice or display that is different from the voice or display determined as a result of the decision made by the alarm decision unit 12.

Further, this invention can also be applied to an obstacle detection system for a vehicle that detects obstacles behind the vehicle.

According to the present invention, a decision is made as to whether the object detected by the radar is an obstacle by using the speed of the vehicle, the overlap in the width direction of the vehicle, between the vehicle and the object, and the relative distance between the vehicle and the object. Thus, only those objects that are detrimental to the traveling of the vehicle are identified as obstacles.

Further, according to the present invention, the driver can be informed, in advance, of the possibility that control to avoid a crash with an object present in the traveling direction of the vehicle that is identified as an obstacle, may be performed. This prevents the driver from undergoing a crash avoidance control operation unprepared.

In addition, the automatic braking to avoid a crash with the detected obstacle can be carried out at an appropriate time.

Also, the reference distance used to perform the control for avoiding an obstacle in the traveling direction of the vehicle can be calculated precisely based on the overlap, the speed of the vehicle and the relative distance to the obstacle, thus preventing haphazard conducting of maneuvering required in avoiding a crash with the object in the traveling direction of the vehicle.

One embodiment of this invention has been described in detail. It is noted that this invention is not limited to the above embodiment but that various design modifications may be made without departing from the spirit of the invention as defined in the claims.

We claim:

1. An obstacle detection system for a vehicle, comprising:
   a radar for performing a search operation to locate an object, said radar including an electromagnetic wave transmission means for transmitting an electromagnetic wave in a traveling direction of the vehicle and a reflected wave reception means for receiving a reflected wave produced when the electromagnetic wave transmitted from the electromagnetic wave transmission means is reflected by an object present in the traveling direction of the vehicle, said radar having an output in response to the detection of an object based on the result of the search operation of said radar;
   a vehicle speed detection means for detecting the speed of the vehicle;
   a relative distance calculation means coupled to the output of said radar, for calculating a relative distance to the object present in the traveling direction of the vehicle, based on the output of said radar;
   an overlap calculation means coupled to the output of said radar, for calculating an overlap in the width direction of the vehicle between the vehicle and the object, based on the output of said radar; and
   an obstacle decision means coupled to said vehicle speed detection means, said relative distance calculation means, and said overlap calculation means, for deciding whether the object detected by the radar is an obstacle, based on a detected value determined by said vehicle speed detection means, a calculated value determined by said relative distance calculation means, and a calculated value determined by said overlap calculation means.

2. An obstacle detection system for a vehicle according to claim 1, further comprising an annunciation means for making an annunciation when said obstacle decision means identifies the object as an obstacle.

3. An obstacle detection system for a vehicle according to claim 1 or 2, further including a brake signal output means for outputting a signal to activate an automatic braking device based on the decision of said obstacle decision means that the object detected by said radar is an obstacle.

4. An obstacle detection system for a vehicle according to claim 1 or 2, wherein said obstacle decision means includes a distance calculation unit for calculating a distance to the object required for the driver to steer away from the object detected by said radar, based on the detected value determined by said vehicle speed detection means, the calculated value determined by said overlap calculation means, and the calculated value determined by said relative distance calculation means.

5. An obstacle detection system for a vehicle according to claim 4, wherein said distance calculation unit calculates the distance based on a relative speed with respect to the object, determined from the detected value determined by said vehicle speed detection means and the calculated value determined by said relative distance calculation means, and further based on a time during which the vehicle is steered to laterally move the distance equal to the calculated value of said overlap calculation means.

6. An obstacle detection system for a vehicle according to claim 3, wherein said obstacle decision means includes a distance calculation unit for calculating a distance to the object required for the driver to steer away from the object detected by said radar, based on the detected value determined by said vehicle speed detection means, the calculated value determined by said overlap calculation means, and the calculated value determined by said relative distance calculation means.

7. An obstacle detection system for a vehicle according to claim 6, wherein said distance calculation unit calculates the distance based on a relative speed with respect to the object, determined from the detected value determined by said vehicle speed detection means and the calculated value determined by said relative distance calculation means, and further based on a time during which the vehicle is steered to laterally move the distance equal to the calculated value of said overlap calculation means.

* * * * *